PATENTED APR 27 1971　　　　　　　　　　　　　　　　　　3,576,073
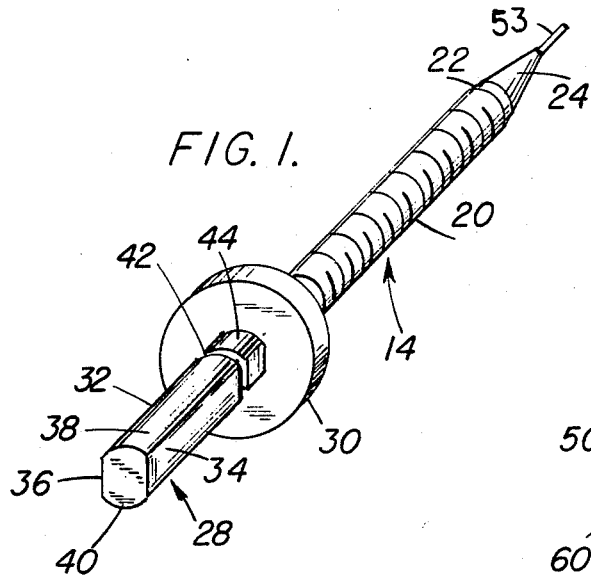
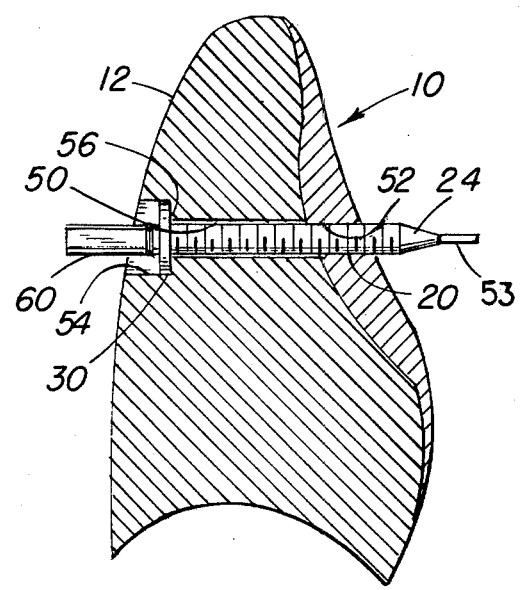
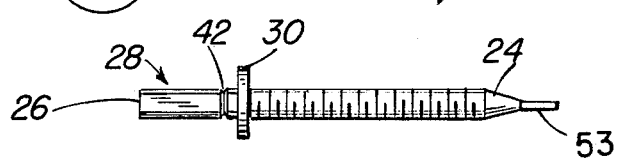
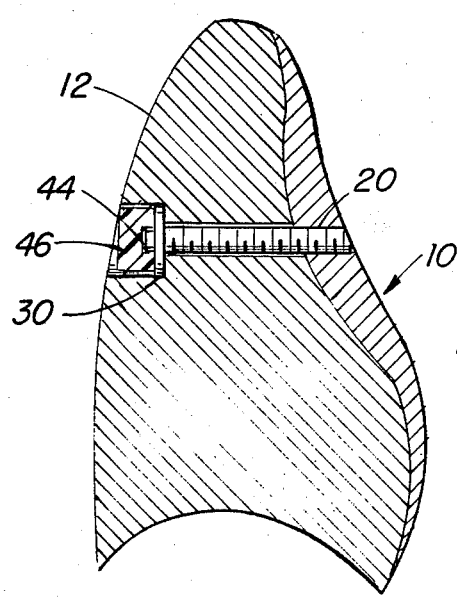
INVENTOR.
BERNARD WEISSMAN
BY Friedman & Goodman
Attorneys

United States Patent

[11] 3,576,073

[72] Inventor Bernard Weissman
304 Ashland Place, Brooklyn, N.Y. 11217
[21] Appl. No. 825,735
[22] Filed May 19, 1969
[45] Patented Apr. 27, 1971

[54] SECURING MEANS FOR A DENTAL RETAINING SPLINT
12 Claims, 5 Drawing Figs.

[52] U.S. Cl. .................................................... 32/6
[51] Int. Cl. ............................................. A61c 13/22
[50] Field of Search ........................................... 32/6

[56] References Cited
UNITED STATES PATENTS
3,395,455  8/1968  Overby et al. ................  32/6

Primary Examiner—Robert Peshock
Attorney—Friedman and Goodman

ABSTRACT: Securing means for a dental splint used in the reinforcement and retention of teeth in the mouth comprising a securing member having a head and threaded shank portions, a collar intermediate the head and threaded shank portions, and covering means provided for said head portion.

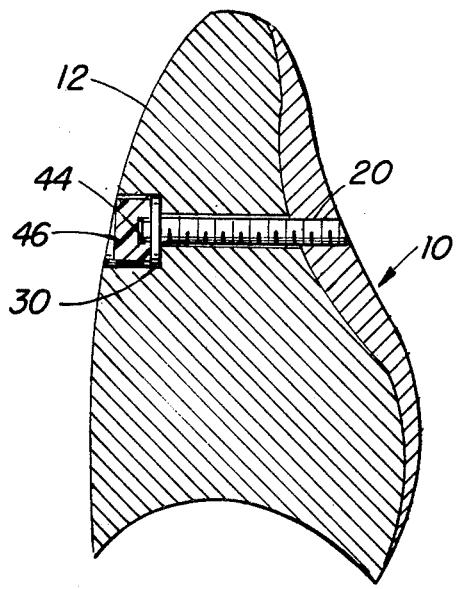

SECURING MEANS FOR A DENTAL RETAINING SPLINT

BACKGROUND OF THE INVENTION

1. Field of the Invention

This invention relates generally to a splint for the reinforcement and retention of teeth in the mouth and more particularly to novel securing means therefor.

2. Description of the Prior Art

The practice of reinforcing natural teeth my means of a splint structure disposed along the lingual surfaces of anterior teeth is now recognized in the practice of dentistry. Generally, what is done is to drill apertures in each of the involved teeth, thence locating pins are inserted through the apertures, impressions are made with the locating pins in place, the pins are removed, the impression is next removed, the pins are reinstalled in the impression and a cast model is made from the impression. Thereafter, a wax-up is formed which corresponds to the configuration of the desired splint overlying the lingual areas of the involved teeth. This is accomplished by first placing a threaded pin through the apertures in the cast model and a nut is drawn up thereon. Subsequently, a wax-up is made of the splint body and finally a metal casting of the splint is made. This prior art procedure is more fully described in my recently issued U.S. Pat. No. 3,348,311. Reference to that patent will show that ultimately a threaded nut becomes a part of the metal splint by virtue of its being embedded therein during the splint-casting process, which nut is in registry with the apertures previously drilled in the involved teeth. A suitable screw is then inserted into each of the apertures in the tooth threadably engaging it with the associated nut.

SUMMARY OF THE INVENTION

It is, therefore, among one of the principal objectives of the invention to provide improved and novel means for securing a splint structure to the teeth which are desired to be reinforced.

In accordance with the present invention, the securing means comprise a securing member having a head and a threaded shank portion, a collar intermediate the head and threaded shank portions, and covering means provided for said head portion.

BRIEF DESCRIPTION OF THE DRAWING

The invention will be hereinafter more fully described with reference to the accompanying drawing, in which:

FIG. 1 is a view in perspective showing a securing member constructed according to the invention, and as shown in greatly magnified condition.

FIG. 2 is a side view of the securing member shown in FIG. 1.

FIG. 3 is a view in perspective of the covering means for the head portion of the securing member.

FIG. 4 is a sectional, side elevational view of a splint and tooth with the securing device shown threadably engaged in registered apertures provided in the splint and tooth.

FIG. 5 is a view similar to FIG. 4 except that the securing device is shown in fully secured emplacement and in finished relationship with tooth and splint.

DESCRIPTION OF THE SPECIFIC EMBODIMENTS

Referring now to the FIGS. of the drawing, the invention will be described in conjunction with mandibular dentition, wherein it is desired to install a retaining splint 10 to overlie lingual areas of the anterior teeth, of which tooth 12 is an example. It is understood that this particular splint installation is selected for illustrative purposes only and that the subject invention may be applied to a wide variety of tooth combinations.

The preparation of the apertures in the teeth to be reinforced, and the splint as well as its registered apertures are adequately described in said U.S. Pat. No. 3,348,311, and need not be further discussed here.

As may be seen from FIGS. 1, 4 and 5, the installation is accomplished by locating the splint 10 against the lingual surfaces of the involved teeth 12 (for convenience only one tooth is shown) and inserting a securing member 14 into each of the registered apertures in the teeth and splint threadingly engaging said securing member with the associated internal threads in each aperture.

Describing now the invention securing device in greater detail, it comprises a securing member 14 having a threaded shank portion 20 terminating at one end 22 in an unthreaded elongated tapered lead 24 and at its other end 26 in a head portion 28. Preferably, tapered lead 24 terminates, in turn, into an elongated needlelike lead 53. Intermediate the head portion 28 and the shank portion 20, there is provided a collar 30, preferably circular in configuration.

The head portion 28 is preferably an elongated body 32 having a pair of parallel opposing flat sidewalls 34, 36 and opposing curved upper and lower walls 38 and 40, respectively. In a preferred embodiment, head portion 28 is adapted to be partially removable from the securing member 14 by providing a generally V-shaped groove or cut 42 into the body 32, contiguous with the upper and lower walls 38 and 40 and sidewalls 34, 36. Groove 42 is located at a position close to the collar 30, so that when groove 42 is completely cut through only a small part 44 of the head 28 will remain, as will be seen subsequently hereinbelow.

Covering means (FIG. 3) are provided for the severed head portion 44 comprising a generally annular body 46 provided with a generally central bore 48 which is associatingly shaped to slidingly receive the severed head portion and completely overlie it, as will also be more fully shown.

It is to be understood that the securing device of the invention is composed of parts of such miniature size as to be employable in the teeth and splint. Typically, the dimensions may be, as an illustrative example, the following:

Threaded shank 20—.0305 inch diam.
Collar 30—.010 inch width.
Groove 42—.020 inch deep.
Head portion 28—.140 inch long x .020 inch diam.
Severed head portion 44—.020 inch long.
Tapered lead 24—down to .014 inch.

The device is formed of a suitable dental metal, such as gold alloy, or the like.

Describing now, in greater detail, the operation of the invention, the securing member 14 is inserted via its elongated leads 24 and 53 into aperture 50 of tooth 12 until the leading threads of the shank portion 20 engage with the associated threads of the aperture. The tapered lead is among one of the specific features of the invention, in that it enables the securing member to be inserted into the aperture of the tooth without immediately becoming threadingly engaged, i.e., until the proper alignment of the screw member is achieved in the associatingly threaded aperture. This eliminates the discomfort to the patient which would occur if a proper alignment were not achieved and the dentist had to unthread the securing member and start all over again. The elongated lead 53 enables the securing member to be grasped from that end by a suitable tool thereby rendering the securing member holdable in place within the registered apertures.

When the securing member is properly aligned within the apertures, as described above, the threaded shank portion is finally threaded home through aperture 50 in the tooth 12 and into internally threaded registered aperture 52 of the splint 10, until the collar 30 is disposed within countersunk portion 54 of the tooth aperture (previously provided, as described in U.S. Pat. No. 3,348,311); with the collar in abutment with the resultant shoulder 56 provided by the countersunk bore 54, inside the tooth.

The abutment of the collar with the shoulder allows for the splint 10 to be tightly drawn up against the tooth. The position of the securing member 14 is at this point in the condition shown by FIG. 4, that is, with the leads 24 and 53, and a forward part of threaded shank 20 protruding out of the aperture 52 of the splint, and a rearward part of the head portion 28 protruding out of the countersunk bore 54 of the tooth aperture 50, When the splint is tightly secured against the involved tooth, the severable portion 60 of the head 28 is cut off at the groove 42, provided for that purpose, leaving only the severed head portion 44 (FIG. 5). Similarly, the excess part of the threaded shank is cut off to provide a smooth continuum along the lingual surface of the splint. Thereafter, the covering means comprising the annular body 46 are inserted over the remaining head portion 44 via bore 48, which, as earlier mentioned, is associatingly shaped so that it will slidingly fit over the specially shaped head portion. The diameter of the annular body 46 is of a dimension such that it will fit inside the countersunk bore, the covering means serving to further lock the remaining head portion 44 in place. Any space remaining is filled in with a material matching the tooth color.

I claim:

1. A device for securing a dental-retaining splint to a plurality of teeth in a mouth, said device comprising a securing member provided with a threaded shank portion insertable through an aperture in a tooth for threaded engagement into a threaded aperture provided in the splint, a head portion for threading said shank portion into the splint, and collar means disposed intermediate said head and shank portions for abutting the tooth with the tooth being disposed between the splint and said collar means so that the splint is tightly drawn against the tooth when said shank portion is threaded into the splint.

2. A device according to claim 1 wherein said threaded shank portion terminates at one end thereof in an elongated tapered lead to enable said securing member to be inserted into the tooth aperture without immediately becoming threadingly engaged, thereby permitting proper alignment of said shank portion in the threaded aperture.

3. A device according to claim 1 wherein said head portion further comprises an elongated body having a pair of parallel opposing flat sidewalls and opposing curved upper and lower walls, said head portion being adapted to be partially removable from said securing member by providing a groove into said body contiguous with said upper and lower walls and sidewalls, said groove being provided at a position close to said collar.

4. A device according to claim 3 wherein said device includes a covering means for said head portion, said covering means comprising a generally annular body provided with generally central opening means adapted to associatingly and slidingly receive said remaining head portion after partially removing said head portion.

5. In combination, securing means and a dental-retaining splint for retaining a plurality of teeth in a mouth, said splint being provided with a plurality of apertures substantially registerable with a plurality of apertures provided in the teeth, said splint apertures being provided with internal threads, said securing means comprising a plurality of securing members, each of said securing members being provided with a threaded shank portion insertable through one of the teeth apertures for threaded engagement into one of said threaded splint apertures, a head portion for threading said shank portion into said one threaded splint aperture, and collar means disposed intermediate said head and shank portions for abutting one tooth of said teeth with said tooth being disposed between the splint and said collar means so that the splint is tightly drawn against the tooth when said shank portion is threaded into the splint thereby securing said dental-retaining splint to the teeth.

6. A combination according to claim 5 wherein said head portion is adapted to be partially severable, each of said securing members being further provided with covering means, said covering means being adapted to slidingly fit over the resultingly remaining head portion when it is in the severed condition to lock said remaining head portion in place with respect to the tooth.

7. A device for securing a dental-retaining splint comprising a securing member having a head and threaded shank portions, said head portion being rotated to thread said shank portion, a collar is disposed intermediate said head and threaded shank portions to define an abutment to limit insertion of said securing member when said shank portion is threaded, and covering means provided for said head portion, said threaded shank portion being provided at its leading end with an elongated unthreaded tapered portion integral therewith to permit proper alignment thereof, said head portion further comprising an elongated body having a pair of parallel opposing flat sidewalls and opposing curved upper and lower walls, said covering means being provided with a generally centrally disposed aperture associatingly shaped to slidingly fit over said head portion.

8. A device according to claim 7 wherein said head portion is adapted to be partially severable from said securing member.

9. A device according to claim 7 wherein a V-shaped groove is provided into said body contiguous with said upper and lower walls and sidewalls, said groove being provided at a position close to said collar.

10. A device according to claim 7 wherein said collar is generally circular in configuration.

11. A device according to claim 2 wherein said tapered lead terminates in turn into an elongated needlelike lead.

12. A device according to claim 7 wherein said tapered lead terminates in turn into an elongated needlelike lead.